(No Model.)
J. W. RICHARDS & C. W. ROEPPER.
PROCESS OF AND APPARATUS FOR ELECTROLYTIC RECOVERY OF METALS FROM THEIR SOLUTIONS.
No. 591,571. Patented Oct. 12, 1897.
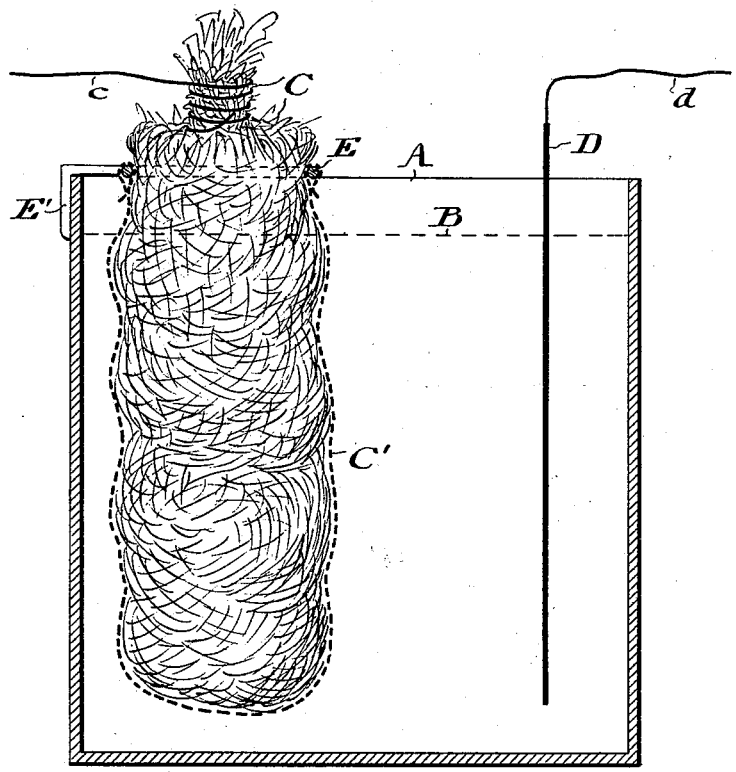
WITNESSES:
INVENTORS

United States Patent Office.

JOSEPH W. RICHARDS AND CHARLES W. ROEPPER, OF BETHLEHEM, PENNSYLVANIA.

PROCESS OF AND APPARATUS FOR ELECTROLYTIC RECOVERY OF METALS FROM THEIR SOLUTIONS.

SPECIFICATION forming part of Letters Patent No. 591,571, dated October 12, 1897.

Application filed January 7, 1897. Serial No. 618,385. (No model.)

*To all whom it may concern:*

Be it known that we, JOSEPH W. RICHARDS, a subject of the Queen of Great Britain, and CHARLES W. ROEPPER, a citizen of the United States, residing at Bethlehem, in the State of Pennsylvania, have invented certain new and useful Improvements in Processes of and Apparatus for the Electrolytic Recovery of Metals from Their Solutions, of which the following is a specification.

Our invention relates to the nature and treatment of the cathodes employed in the recovery of metals from their solutions, and has for its object to obtain a cathode having a very widely diffused surface for deposition of metal within a small bulk, and at the same time one of such nature that the deposited metal may be recovered from the cathode by destroying the body thereof.

It is within the class of organic substances that most of the objects which embody the two desirable characteristics just mentioned for electrolytic purposes are to be found, but as most of these are of relatively high electrical resistance it is necessary to render them good conductors of electricity in order that they may be made available.

We have found that by resorting to expedients hereinafter described many organic substances which either naturally or artificially have a loosely-woven or matted fiber or a spongy or comminuted formation may be employed in a mass as cathodes. Such masses, by reason of their highly-extensive internal surface and penetrability to a circulating electrolyte, expose a very large surface for deposition within a comparatively small bulk, while at the same time they are capable of being substantially destroyed by moderate heat when their function as cathode has been completed.

The accompanying drawing illustrates in vertical section an electrolytic cell suitably furnished for the practice of our invention.

Masses of various substances—such, for example, as shavings, excelsior, matted or tangled threads, loosely-woven or shredded fabrics, &c.—all expose a very large internal surface for a given bulk, and consequently lend themselves to the practice of our invention, it being, however, understood that those substances must be chosen which do not pack too tightly on being wetted, so as to interfere with the circulation of the solution through their interstices. In other words, the mass thus formed must be a substantially porous one, so that the deposition of the metal may take place not only upon the external surface, but throughout the interstices of the mass. Furthermore, all of the substances which have been spoken of are substantially destructible by moderate heat and are therefore fitted to be used in the last step of our process. In addition to the substances which have been enumerated interlaced wood fiber, corn-pith, masses of linen, paper, hemp, jute or cocoa fiber, matted or woven, and fine, flaky, or granular masses, such as wood-sawdust, are also capable of being used in our process. As such materials are commonly poor conductors of electricity even when wetted, they should be subjected to a preliminary treatment for the purpose of rendering them conductive before they are capable of being used in connection with our invention. This treatment may consist either in powdering their surfaces with graphite or a suitable metallic powder or in soaking them in a metallic solution from which the metal can be precipitated upon them by a subsequent chemical reaction, such as exposure to light, heat, a reducing-gas, or reducing solution. To illustrate, a mass of wood-shavings or excelsior, if put into a revolving barrel with graphite-dust, dry or wet, soon becomes pretty thoroughly coated upon all its surfaces with the graphite, or, as it may be expressed, "plumbagoed." This coating may be facilitated by slightly wetting the mass previously with a solution of gum, sugar, or glycerin, and instead of graphite a metallic dust—as, for example, spongy silver precipitated from silver nitrate by metallic copper—may be employed, or the mass to be coated may be soaked in a solution of gold chlorid or silver nitrate, then dried in the air in bright sunlight or in a hot oven, resulting in the precipitation of the metal throughout the mass; or, again, the mass may be soaked in gold chlorid, and after being dried dipped into a solution of ferrous sulfate, whereby finely-divided gold is precipitated upon all its surfaces. Any one of these substances which we have enumerated or one of a like character having been thus rendered conductive our process proceeds to employ it in a mass as a cathode for the electrolization of a metallic solution. For this purpose the mass, if sufficiently coherent, may be freely suspended in the solution. If not thus coherent, it may be used in a tray or bag suspended in the solution. The passage of the electric current then causes the deposition of the metallic element in the solution upon the entire surface, both external and internal, of the cathode, the large extension of this surface causing great rapidity and completeness of this action.

An appropriate method of conducting this process is illustrated in the accompanying drawing, in which A represents an electrolytic tank or cell filled with the metallic solution B. Suspended within this solution are the electrodes C D, of which the latter is an anode of any suitable material, while the former is a cathode consisting in the present instance of a mass of plumbagoed excelsior. c d represent the wires by which the external connections of the wires are completed. As has just been stated, the excelsior may be allowed to hang freely in the solution. In many instances, however, any possible disintegration of the mass is more effectually prevented by inclosing it with a bag of permeable material, such as netting or cheese-cloth C'. This bag is shown suspended by a ring E, attached to a bracket E', which is affixed to the side of the tank.

When the deposition of the metal has proceeded to the desired point, the cathode with its deposit is withdrawn. It may then be washed in clean water, if necessary or desirable, and finally dried in the air or in an oven and burned or substantially destroyed by heat. This destruction may be effected in a muffle, tray, crucible, or oven, or, indeed, any suitable apparatus which permits the residue to be carefully preserved. The ash or residue is then gathered together and the metal extracted from it by winnowing, washing, amalgamating, or simply melting down with a suitable flux, such as soda or borax.

We are aware that it is not new to employ a sheet of textile material as an electrode for the deposition thereon of metal in the form of a layer or foil on its external surface, in which case no more available surface for deposition is obtained than where a metal plate is used. Our invention is distinguished from this in employing only masses of substances more or less penetrable throughout by the electrolyte and having an extensive internal surface available for deposition of metal.

Having thus described our invention, we claim—

1. The process of recovering metals from their solutions, which consists in first, applying an electrically-conductive coating to and throughout a highly-porous mass of organic substance, having an extensive internal surface and penetrable by the electrolyte; second, in depositing the metal, which is to be recovered, upon the mass thus coated, by constituting it a cathode in an electrolytic bath containing said metal in solution; and, third, in recovering the metal thus deposited, by destroying said substance by heat, substantially as described.

2. A cathode for receiving electrolytically-deposited metal, which consists of a highly-porous mass of an organic substance, having an extensive internal surface and penetrable to a circulating electrolyte, said mass having its conductivity increased by a superficial and interstitial coating of an electrically-conductive material, substantially as described.

JOSEPH W. RICHARDS.
CHARLES W. ROEPPER.

Witnesses:
 ROBT. H. NOLLE,
 J. B. KEMERER.